Patented Mar. 30, 1937

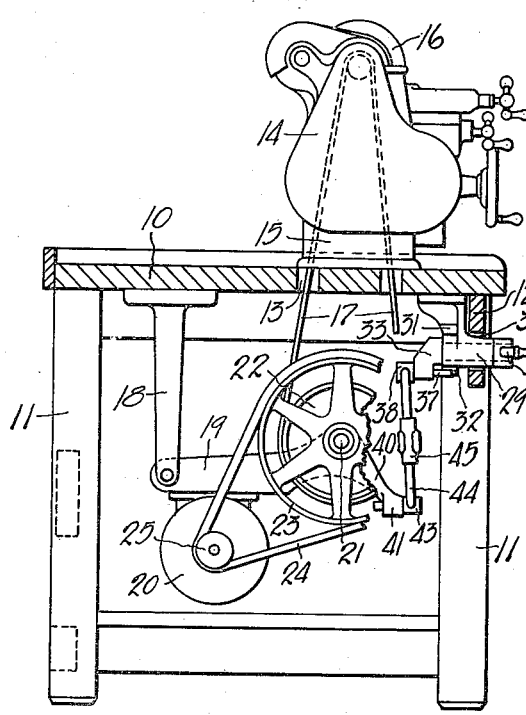

2,075,297

UNITED STATES PATENT OFFICE 2,075,297

BELT DRIVE

John J. O'Brien, South Bend, Ind., assignor to South Bend Lathe Works, South Bend, Ind., a corporation of Indiana Application April 3, 1936, Serial No. 72,461

8 Claims. (Cl. 74—242.15)

This invention relates to a belt drive, and particularly to a belt drive for bench mounted machines.

The primary object of the invention is to provide belt driving means of this character positioned beneath and within the overall outline of the bench mounting the machine, whereby danger of contact therewith by an operator is eliminated.

A further object is to provide a belt drive of this character which is readily controllable and adjustable.

A further object is to provide a belt drive of this character with a control member positioned exteriorly of the outline of the bench.

A further object is to provide a belt drive of this character with novel means for selectively locking the same in operative and inoperative relations.

A further object is to provide a belt drive of this character with novel belt tightening means.

Other objects will be apparent from the description and the appended claims.

In the drawing:—

Figure 1 is a side view illustrating the drive means mounted on a bench to drive a bench lathe, some of the parts being illustrated in section and other parts being broken away.

Figure 2 is a fragmentary view in front elevation.

Figure 3 is an enlarged view of the control means with parts shown in section.

Figure 4 is a fragmentary view of the control means in rear elevation.

Figure 5 is a view of a bracket in rear elevation.

Referring to the drawing, which illustrates the preferred embodiment of the invention, the numeral 10 designates the top of a bench which is provided with legs 11 and a front longitudinal cleat 12. The bench top is provided with a pair of passages 13 therethrough. A small lathe 14 or other belt driven machine adapted to be mounted on the bench, is provided with a hollow support 15 at the end thereof supporting the headstock 16 or other driving head and communicating with the passages 13, whereby the runs of a drive belt 17 passing over the conventional headstock pulley may extend downwardly through the support 15 and passages 13.

One or more supports 18 depend from bench top 10 at the rear thereof, and at the lower end thereof is pivotally mounted one end of a normally substantially horizontal cradle 19 which extends forwardly therefrom. The cradle 19 mounts a drive motor 20 adjacent the rear end thereof and journals a shaft 21 adjacent the forward end thereof. The shaft 21 mounts a step pulley 22 in conventional reverse relation to the step pulley in headstock 16, and the lower portion of belt 17 runs around said step pulley. Shaft 21 also mounts a drive pulley 23 around which runs a belt 24 driven by a motor mounted pulley 25.

A bracket is mounted on the under side of the bench top 10 adjacent the rear side of cleat 12 and above cradle 19. This bracket comprises a horizontal securing flange 26, and vertical flange 27 in spaced parallel relation to the inner face of cleat 12, an inclined flange 28 perpendicular to flange 27 and a horizontal tubular member or bearing 29 at the lower end of flanges 27 and 28. The bracket is of integral construction, and the bearing portion 29 thereof projects forwardly of flange 27 to project through an opening 30 in the cleat 12. The flange 28 is provided with a thickened portion 31 adjacent bearing portion 29, and the bracket includes a lug 32 depending from the lower side of the bearing at the inner end thereof, all as best illustrated in Fig. 5, and for purposes to be hereinafter set forth.

A crank 33 is positioned rearwardly of the bracket, and includes a forwardly extending shaft 34 journaled in bearing 29 and projecting forwardly therefrom. At its forward end the shaft 34 mounts a crank arm 35 carrying a handle 36, said crank arm and handle being spaced forwardly from cleat 12. A pin 37 is journaled in the free end of crank 33 in parallel relation to shaft 34, and mounts a head 38 at its rear end. The forward end of the pin 37 projects from crank 33 and is adapted to abut both the bracket shoulder 31 and the bracket lug 32, as best illustrated in Fig. 3.

The cradle 19 carries a forwardly projecting arm 40 in substantially vertical alignment with shaft 34, and said arm terminates in a bearing portion 41 whose axis is substantially perpendicular to the axis about which the cradle is pivoted to support 18. In bearing 41 is journaled a pin 42 whose forward end mounts a head 43. A pair of rods 44 interconnected by a turnbuckle 45 are each provided with perpendicularly bent ends 46, and said bent ends are journaled in suitable apertures in the heads 38 and 43 perpendicularly to the pivot pins 37 and 42, respectively, of said heads.

In the operation of the device, the crank 35, 36 provides means for rotating crank 33 to raise and lower head 38, and thereby pivot the cradle 19 upwardly and downwardly. In this movement, it will be seen that the perpendicular relation of the pivot mounting of the respective heads 38, 43 to the pivot connections 46 of the rods 44 with said blocks, accommodates the variations in angular position which the parts must assume incident to the arcuate swinging of crank 33 and the arcuate raising and lowering movement of the cradle carried head 43. It will also be noted that the shoulder 31 and lug 32 of the bracket, see Figs. 4 and 5, have their inner faces in substantially vertical alignment slightly laterally off-set from the pivot axis of bearing 29. This permits the crank 33 to rotate slightly more than 180 degrees between the shoulder and lug, which rotation is stopped by engagement of the pin 37 with said shoulder and lug, and also positions said pin 37 slightly overcenter with relation to shaft 34 at each extreme of movement thereof, as best illustrated in Fig. 4. Therefore, when the parts are shifted to the position illustrated in Figs. 3 and 4, the slight overcenter relation of pin 37 to shaft 34 serves to effectively hold the cradle 19 in raised position; and when the parts are reversely positioned with pin 37 engaging lug 32 as illustrated in Figs. 1 and 2, the overcenter relation locks the cradle in depressed position against the tension of the belt 17 effected thereby. It will also be seen that the interposition of the turnbuckle 45 in the means connecting the cradle and the operating mechanism permits a wide range of adjustment of the belt tension applied by the device. It will also be seen that the drive parts, except crank 35, 36 are positioned within the overall outline of the bench.

I claim:—

1. The combination with a bench, and a belt driven machine mounted thereon, of a pulley mounting pivoted beneath said bench, a terminal member journaled in the free end of said pulley mounting, a bracket carried by said bench, a crank journaled in said bracket, a terminal member journaled in the free end of said crank, means for interconnecting said terminals, said interconnecting means being pivoted to said terminals, and opposed stops on said bracket engageable by said last named terminal member for stopping the same in slightly overcenter position at each extreme of its movement.

2. The combination with a bench, a belt driven machine mounted on said bench, and a drive belt, of a belt driving unit pivoted beneath said bench, a bracket carried by said bench above said driving unit, a crank journaled in said bracket, means interconnecting said crank and drive unit, and opposed stops on said bracket engageable by said means for stopping the same in slightly overcenter position, one stop when engaged by said means cooperating with the means to hold said drive unit in belt tensioning position and the other stop when engaged by said means cooperating with the means to hold said drive unit raised in belt releasing position.

3. The combination with a bench, a belt driven machine mounted on said bench, and a drive belt, of a belt driving unit pivoted beneath said bench, a bracket carried by said bench above said driving unit and including a pair of opposed stops, and crank operated means associated with said bracket and connected to said driving unit for adjusting the vertical position of said driving unit for selectively applying and releasing belt tension and engaging said stops whereby to be held at vertically spaced opposite substantially dead center extremes of movement, the belt tension applying and releasing positions.

4. The combination with a belt driven machine, of means for selectively applying or releasing belt tension comprising a shiftable driving unit, a part pivotally mounted on said unit, operating means, a part pivotally mounted on said operating means, and a link connecting said parts and pivoted thereto perpendicularly to the pivot axes thereof.

5. The combination with a belt driven machine, of means for selectively applying or releasing belt tension comprising a shiftable pulley support, a part carried by and rotatable relative to said support, a bracket having a pair of opposed stops, a crank carried by said stationary bracket and engageable with said stops, a part carried by and rotatable relative to said crank, and means connecting said rotatable parts and pivoted thereto perpendicularly to the axes thereof.

6. The combination with a belt driven machine, of means for selectively applying and releasing belt tension comprising a shiftable support for a driving member, a head rotatably carried by said support, operating means including a rotatable head, means connecting said heads and pivoted thereto perpendicularly to the pivot axes thereof, and stops for holding said operating means at substantially dead center position in tension applying and releasing relation.

7. The combination with a belt driven machine, of means for controlling belt tension comprising a pivoted support for a belt driving member, a head pivoted to said support about an axis perpendicular to the pivot axis of said support, a crank, a bracket journaling said crank and including a pair of opposed stops engageable by said crank, a head pivoted to said crank parallel to the crank axis, and a member connecting said heads and pivoted thereto about axes perpendicular to the pivot axes thereof.

8. The combination with a belt driven machine, of means for selectively applying and releasing belt tension comprising a pivoted support for a belt driving member, shiftable operating means spaced from said driving member, an elongated link extending between said driving member and operating means, a connector pivotally mounted on said support and a connector pivotally mounted on said operating means, said link being pivoted at its ends to said connectors about axes perpendicular to the pivot mounting axes of said connectors.

JOHN J. O'BRIEN.